Feb. 21, 1961 W. M. COCHRAN ET AL 2,972,541
DOMESTIC OIL HARD BUTTERS, COATINGS THEREOF, AND
PROCESS FOR PREPARING SAID BUTTERS
Filed Sept. 16, 1957
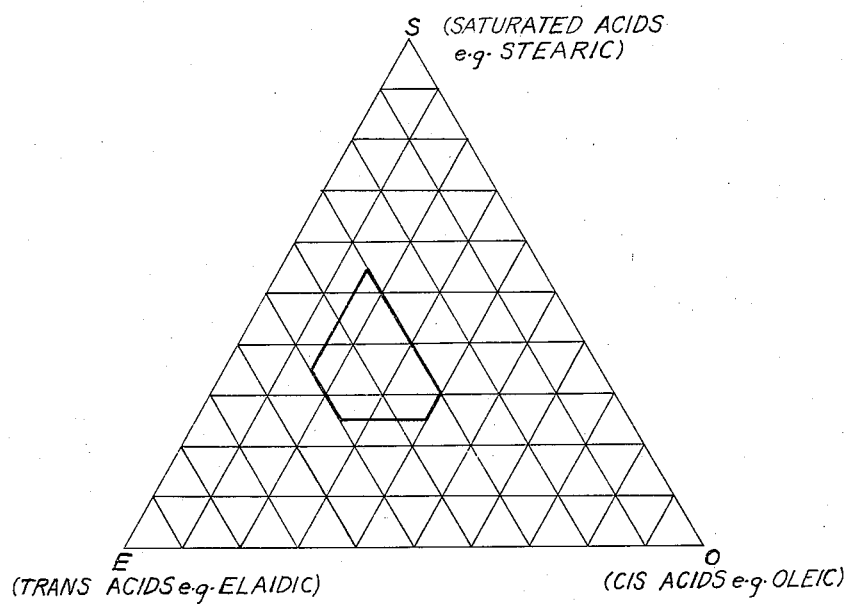
WALTER M. COCHRAN
MELVIN L. OTT
BRONISLAW R. WONSIEWICZ
THEODORE J. ZWOLANEK
INVENTORS
BY G.G. Christensen
ATT'Y United States Patent Office 2,972,541
Patented Feb. 21, 1961

2,972,541

DOMESTIC OIL HARD BUTTERS, COATINGS THEREOF, AND PROCESS FOR PREPARING SAID BUTTERS

Walter M. Cochran, Highland Park, Melvin Leroy Ott, Park Ridge, Bronislaw R. Wonsiewicz, Naperville, and Theodore J. Zwolanek, Chicago, Ill., assignors to The Glidden Company, Cleveland, Ohio, a corporation of Ohio Filed Sept. 16, 1957, Ser. No. 684,350

15 Claims. (Cl. 99—118)

This invention relates to hard butters prepared from non-lauric oils such as cottonseed, soybean and other vegetable oils, or from lard and other animal oils and/or fats, or mixtures of vegetable oils, of animal oils, or of animal and vegetable oils.

Hard butters, so-called because of their peculiar combination of relatively good hardness at room temperatures and sharp melting point at body temperatures (98.6° F.) have heretofore been prepared mainly from lauric oils such as coconut, palm-kernel, tucum, muru-muru, ouricury and similar tropical oils having at least about 38–40% of lauric acid in their component triglycerides. A more recent development (U.S. Patent 2,726,158) combines such lauric oils with various non-lauric oils and by inter-esterification of properly proportioned mixtures of such oils, secures hard butters.

One object of the present invention is to provide hard butters which have been prepared from non-lauric oils, i. e. oils or other triglyceride mixtures containing less than a few (e.g. 5–6%) percent of combined $C_{14}$ and lower fatty acids, by weight, on the total combined acids of the oils or mixtures and which are composed essentially of triglycerides of fatty acids of 16 and 18 carbon atoms.

Another object is to provide improved hard butters which have little tendency to undergo polymorphic changes in crystal structure and to provide edible coatings which exhibit good gloss-retention qualities.

Another object is to provide a solvent fractionation process by means of which the particular triglycerides of partially hydrogenated non-lauric oils manifesting the characteristics of hard butters can be separated from other triglyceride components which do not possess such characteristics.

Still another object is to provide improved liquid oils as by-products of the above fractionation processes.

A further object is to provide improved edible coatings containing our improved hard butters, the latter extended or not with small amounts of the improved liquid oils.

The foregoing and other objects will be understood more fully from the following description of the invention taken in conjunction with the attached figure of drawings illustrating the kinds and proportions of fatty acids which compose our hard butters.

We have discovered that a variety of vegetable and animal oils indigenous to the continental United States, or mixtures thereof, and/or their non-continental equivalents can be treated to yield commercially-significant amounts of certain triglycerides having the trade-demanded qualities of hard butters. The treated oils or mixtures can be solvent fractionated in various ways to separate and recover the said certain triglycerides from the remaining triglycerides of the starting oils.

The treatment which is applied to the starting oil(s) in advance of the separation and recovery operation involves hydrogenating the oil(s) under well-known conditions which induce the conversion of unsaturated fatty acid radicals of the oils from the cis configuration to the trans configuration, e.g. the conversion of cis-oleic acid to trans-oleic acid. The hydrogenation is carried out not only to effect this change in configuration but also to lower the initial unsaturation to the point where substantially all remaining unsaturation is monoethenoic in character. Since the starting oils are composed mainly of triglycerides having stearic, oleic, linoleic, linolenic, palmitic and other hydrocarbyl fatty acid radicals in their make-up, the hydrogenation serves to eliminate most, if not all, flavor-instability of the types due to residual polyethenoic unsaturation. In attaining this end, however, the hydrogenation treatment also brings about substantial configurational changes in various of the originally-unsaturated fatty acid radicals, with the result that trans rather than cis forms of those acid radicals are present in sizable amounts. The trans forms should generally constitute at least about 20% by weight of the total acids in the starting oil(s), but in any case should be sufficiently high to yield a hard butter fraction containing at least 30% trans acid(s). Thus, the initial level needs to be adjusted in accordance with the process which is employed to separate and recover the desired hard butter fraction.

We have also discovered that in order to impart hard butter characteristics to a recoverable fraction of the hydrogenated oils, the recovered fraction must consist essentially of a mixture of triglycerides composed in the aggregate of the following percentages of combined hydrocarbyl fatty acids having 16 and 18 carbons:

| | Percent |
|---|---|
| Saturated fatty acids | 25–55 |
| Cis mono-ethenoic acids | 15–40 |
| Trans mono-ethenoic acids | 30–50 |

To this end the starting oil(s) should likewise (but not necessarily) be composed mainly of triglycerides of fatty acids having 16 and 18 carbon atoms. The foregoing proportions are shown graphically in the attached figure of drawings.

The recoverable hard butter fraction separates out of the fractionating solvent solution under conditions which are known to give a type of triglyceride which can be designated as $GS_2U$; that is, its component triglycerides have two saturated acid radicals and one unsaturated acid radical, all combined chemically with glycerine. We do not here wish to be understood as saying that our hard butter fraction consists entirely of $GS_2U$ type triglycerides. What we do mean to say, as clearly as possible, is that our hard butter fraction (which is separated under conditions usually appropriate for $GS_2U$ fractions) is composed mainly of triglycerides whose melting points and solubility characteristics are such that they are crystallized out of a suitable fractionation solvent at the stage where one would normally expect to recover $GS_2U$ type triglycerides. Thus our hard butters are composed mostly of triglycerides of the following types, in admixtures conforming to the proportions of combined acids as set forth above:

Tri trans mono-ene glycerides (e.g. EEE)
Mono saturated, mono (trans mono-ene) mono (cis mono-ene) glycerides (e.g. SEO)
Di saturated, mono (cis mono-ene) glycerides (e.g. SSO)
Di (trans mono-ene), mono (cis mono-ene) glycerides (e.g. EEO)

Adventitious amounts of $GS_3$, $GSU_2$ and $GU_3$ types of glycerides are in most instances apt to be present due to non-sharp separations of the various types from each other by the solvent(s) employed in fractionating the starting oil. While the hard butters can be prepared by merely blending preformed triglycerides of the above types together, the resulting blends have less desirable hard butter qualities than where the same proportions of combined fatty acids are distributed among the triglycerides on a more nearly random pattern, such as occurs when the starting oil is initially in a random or nearly random condition. It will be recognized by those skilled in the art that our hard butter fraction of the starting oils is not in a random condition, and that if the fraction were to be rearranged catalytically (as by treatment with sodium methoxide or other rearrangement catalyst) it would again be necessary to fractionate the rearranged mass in order to retrieve a new fraction having the most desirable qualities of a hard butter.

It should be understood that so-called "hard butter characteristics" (while fairly well known in the art in respect to melting point range, "snap" characteristics, eating qualities, etc.), are not clearly defined by any agency of the U.S. Government nor by any tentative standards of any trade organization. They therefore can vary rather widely with personal judgment. Thus one user may find the hard butter to be satisfactory, but another user may select or prefer to use a harder or softer butter, or he may find the material waxy to his taste, or he may find other minor shortcomings. Accordingly, an ideal hard butter is still hard to define. Nevertheless, when we in this specification say that our mixed triglycerides as described above can, when suitably proportioned, give hard butters, we mean that the mixtures of glycerides has certain recognized qualities which distinguish a trade-designated hard butter from other fat products such as shortenings, cocoa butter, hard fats, etc. Some proportions of the triglyceride components may give soft hard butters, others may give very hard hard butters, some may have a very sharp melting range, others may have a wider melting range which is just narrow enough to permit the product to be classed as a hard butter. However, by varying the proportions of the component acids within the aforesaid ranges, one can tailor-make the resulting fat to his own specifications for trade-acceptable hard butter.

One outstanding feature of our fractionated hard butters (this term being here and elsewhere qualified in accordance with the preceding paragraph) is that they exhibit moderate to excellent resistance to polymorphic changes with temperature. As a result, the hard butters hold their original gloss better than any of the lauric-oil hard butters heretofore used in the confectionery art. They are also compatible with cocoa butter and hence can be blended with chocolate liquor to give chocolate coatings which are quite resistant to the "greying" or "blooming" defect, which defect has been established as resulting from polymorphism in the fats of the coating. We presently are unwilling to say that the resistance to polymorphic changes exhibited by our hard butters is due entirely to the presence therein of trans-oleic type acids but we do feel that these acids are responsible for it in good measure, and that for this reason the hard butters should have at least 30% (by weight of the total combined acids) of trans-mono-ene acids such as trans-oleic acid(s). Those skilled in the art will recognize that there are numerous isomeric acids in the group designated "trans-mono-ene acids" or "trans-oleic acid." While the isomer known as elaidic acid is the most prominent one whose radical is present in our hard butters, radicals of other isomers can be and usually are present along with elaidic acid radicals.

Another quality of our hard butters is their good keeping quality. While the butters can have rather high iodine values, this fact is not inconsistent with good keeping quality because the iodine values always represent monoethenoic unsaturation. Poor keeping quality has long been known to be associated with polyethenoic unsaturation, and usually accompanies appreciable amounts of triethanoic unsaturation, such as is found in linolenic acid. Our selective hydrogenation is carried at least to the point where such polyethenoic unsaturation is eliminated in favor of controlled amounts of monoethenoic unsaturation.

In the foregoing description we have not described in detail the solvent fractionation procedures since these procedures are well known in the glyceride oil art, and as here employed, follow conventional practice. We do not mean to say, however, that only conventional practices must be used. On the contrary, once one recognizes the possibility of securing hard butter fractions from non-lauric oil(s), he will also recognize that the use of solvent(s) to recover the desired fractions can be varied rather widely from conventional practices, as long as the aim is to recover a product which will have the qualities of hard butter. Thus for some end-uses, one may desire a minimum of the $GS_3$ type of glycerides, while other end-uses may permit more of this type of glyceride to be present. By varying the solvent(s), by varying the temperature at which the hard butter fraction or fractions are removed, and by other known means, one can recover a hard butter fraction which excludes or includes significant amounts of the triglycerides of adjoining non-hard-butter fractions.

We have stated hereinabove that the starting oil(s) should generally have at least 20% of trans-oleic type acids present, and that the hard butter fraction should contain at least 30% of trans-oleic type acids. The 30% limit should always be observed, but whether or not 20% of trans-oleic type must be secured in the starting oil(s) cannot be stated with certainty. In some starting oils only 17–18% may be needed to give 30% in the hard butter fraction. With other starting oils, the content of trans-oleic type acids may need to be 25% or 30%. This is because some of the trans-oleic type acid may be combined with saturated acids in some triglycerides of certain starting oils, and hence is apt to separate with the $GS_3$-type glycerides. In such case, part of the starting content of trans-oleic type acid is lost as far as the hard butter fraction is concerned. In other instances, some of the trans-oleic type acid appears in the $GSU_2$ or $GU_3$ fractions and hence is lost as far as the hard butter fraction is concerned. One convenient way to estimate the content of trans-oleic type acid needed in the starting oil (so as to secure at least 30% thereof in the hard butter fraction) is to calculate the percentage of various triglycerides which should exist in the starting oil(s), assuming that the latter are in a random condition of acid distribution. The methods for making these calculations are now well-known, and can be found in various textbooks and trade journal articles (e.g. Fractionation of Lard and Tallow by Systematic Crystallization, by Reimenschneider et al., Oil and Soap, September 1945, pp. 276–282). From such calculations one can estimate the amount of trans-oleic type acid which is apt to find its way into various fractions other than the desired hard butter fraction, and then one can estimate how much trans-oleic type acid should be provided in the starting oil(s). On such basis, however, the starting oils should be rearranged so as to secure random distribution; otherwise, there may be sufficient non-randomness in the starting oils to throw off the original estimates by sizeable percentages. Our present invention contemplates rearrangement of the starting oils since by doing so greater yields of the desired hard butter fraction may at times be secured than when the starting oil is left in its as-received (possibly non-random) condition.

The starting oil(s) are preferably selected so as to be composed mostly of triglycerides of $C_{16}$ and $C_{18}$ hydrocarbyl fatty acids. They can be natural vegetable and/or animal oils and fats, or can be synthetic (pre-esterified) products, or fractions of natural vegetable, animal or fish oils derived from a variety of commercial operations. Fractions derived from directed rearrangements of oils and/or fats can also be used. Assuming that any of these different sources of triglycerides (alone or when blended with others) will provide the needed proportions of saturated to unsaturated acids, then any of such sources can be used to provide our starting oil. Since best yields are usually secured from random starting oil, it is commercially expedient to rearrange the oil particularly where one recognizes that the latter is initially far from being in a random condition. Hydrogenation can of course either precede or follow rearrangement, the latter preferably being carried out wholly in the liquid phase. If the oil, oil mixture, oil-fat mixture or fat-fat mixture initially has the correct proportions of unsaturated to saturated combined fatty acids, so that hydrogenation is not necessary, then any of the known "elaidination" treatments can be used to convert a proper proportion of the cis-mono-ene radicals, e.g. cis-oleic radicals to the corresponding trans radicals. Ordinarily, however, this situation is seldom apt to be encountered, so that hydrogenation is necessary to eliminate polyethenoic unsaturation. Hence, in most instances, it is convenient to conduct the hydrogenation selectively so that both elaidination and elimination of polyethenoic unsaturation are accomplished in a single treatment of the triglyceride material which has been selected as the starting oil.

From the foregoing description it will be apparent that the principal advance in the art made available by our discoveries is that trans-mono-ene acid(s), e.g. trans-oleic acid is a desirable component of non-lauric hard butters, when present in suitable proportions to cis-mono-ene acid(s), e.g. cis-oleic type acid and to saturated acids of 16 and/or 18 carbon atoms. Others have recovered fat fractions which have had hard butter qualities from non-lauric oil, and in one known instance the starting oil had 6% iso-oleic acid (Kane, Proc. Symposium Indian Oils and Fats Nat's Chm. Lab., India, Poona, 1951, pp. 55-7; Chemical Abstracts 47:6676 i). This low initial content of iso-oleic acid was, however, inadequate to point the way to the present discoveries and inventions in which domestic non-lauric oil(s) and their equivalents are the preferred starting materials.

The following examples illustrate the principles of our invention and include the best means presently known to us for practicing those principles:

EXAMPLE 1

A two-step fractionation treatment is here employed, this treatment serving to separate the essentially $GU_3$-type glycerides (generally a soft or liquid fraction) from the hard butter fraction. 1 kilogram of cottonseed oil hydrogenated to a melting point of 112° F. is dissolved in 4 liters of dry acetone and permitted to reach equilibrium at 71°–72° F. The crystallized fats (typically $GS_3$ type components) are then filtered off and washed with a ½ liter of acetone. The filtrate (containing the wash solvent) is then cooled and permitted to reach equilibrium at approximately 30° F. The resulting crystalline hard butter fraction is then filtered off and washed with a ½ liter of solvent. The resulting filtrate containing wash solvent and soft oil ($GSU_2$ and $GU_3$) is reserved for solvent recovery. The addition of 10% to 15% of the soft oil fraction ($GSU_2$ and $GU_3$) to the hard butter fraction in our estimation, enhances the properties of the hard butter fraction.

EXAMPLE 2

(*To illustrate absence of trans-oleic*)

A preliminary investigation was made to determine the behavior of a mixture of mono oleo-disaturated triglycerides as a substitute for cocoa butter in coatings. A mixture of 70% palm oil and 30% soya stearine (0.7 iodine value) was rearranged and solvent fractionated to obtain the oleo-disaturated fraction ($GS_2U$) consisting primarily of tri-glycerides of oleic, palmitic and stearic acids in the amounts expected from random pattern calculations. A yield of 45.2% $GS_2U$-type product was obtained. It was deodorized and evaluated. An edible coating made with this product according to standard procedure possessed good eating qualities and had good initial gloss when enrobed in untempered condition. The "snap," however, was only fair and after a period of time the coating developed a severe bloom.

EXAMPLE 3

Two cottonseed oils hydrogenated with used catalyst to melting points of 112° F. and 116° F., respectively, were solvent fractionated in dry acetone in the manner of Example 1 at 72° F. and 77° F., respectively, to remove the stearine ($GS_3$-type glycerides), and then at 30° F. to remove the hard butter fraction ($GS_2U$-type products). Thermal analysis data indicated that the hard butter fraction removed at 30° F. from the 72° F. batch possessed improved characteristics and a lower melting point as compared with the fraction removed at 30° F. from the 77° F. batch. An increase in yields of stearine was also noted upon lowering the temperature to 72° F. with a corresponding decrease in the yield of of hard butter fraction. At 72° F. an increase in the iodine value of the stearine fraction was also observed and the removal of more triglycerides containing trans-oleic acid ($GU_3$) appeared to be indicated. A temperature of 67° F. was also attempted, but was considered impractical due to the large amount of solids which formed. These tests and others indicated that temperatures between about 68° F. and 78° F. could be used advantageously to separate the $GS_3$-type fractions.

EXAMPLE 4

The effect of hydrogenation upon yields of hard butter fractions was investigated. Hard butter yields of 38.2% and 41.6% were obtained from cottonseed oils hydrogenated with used catalyst at 360° F. to melting points of 112° F. and 116° F. respectively. A yield of 42.2% was obtained from cottonseed oil hydrogenated with used nickel catalyst at 290°–300° F. to a thermal melting point of 111° F.

Compatibility of these hard butter fractions with cocoa butter was investigated. Coatings made with the above hard butter fractions and 10% cocoa butter (by weight) were found to possess excellent eating qualities, gloss and snap. Gloss retention was good and no trace of bloom became evident after three month's storage.

EXAMPLES 5–9

Various oils indicated below were hydrogenated under selective conditions to give trans-oleic acid by employing hydrogen at 30 lbs. gauge pressure, temperatures of 350–360° F. and 0.1% nickel catalyst from a previous hydrogenation. The oils were then separately fractionated in dry acetone by dissolving the oil in acetone with heat (4 liters of acetone per kilogram of oil), cooling the solution to 68° F., holding for 3–4 hours at this temperature with slow agitation, filtering off the crystallized essentially $GS_3$-type glycerides, and washing the crystals with acetone (½ liter per kg. of starting oil). The filtrate (containing wash solvent) was then cooled to 32° F. and held there for about 18 hours, and the crystallized hard butter fraction was filtered off and washed (½ liter per kg. of starting oil). The filtrate was stripped of acetone to recover the third fraction of soft-to-oily glycerides. The results are shown in Table I.

TABLE I

|  | Ex. 5 Hydro P/N | Ex. 6 Hydro S/B | Ex. 7 Hydro Corn | Ex. 8 Hydro Lard | Ex. 9 Hydro C/S |
|---|---|---|---|---|---|
| Whole Oil: |  |  |  |  |  |
| R.I. at 48 C | 44.2 | 44.9 | 44.5 | 42.1 | 44.3 |
| I.V | 56.3 | 62.5 | 54.0 | 46.4 | 54.4 |
| Cong. Pt., ° C | 35.0 | 38.8 | 44.2 | 40.5 | 38.1 |
| Percent Trans-Oleic [1] | 29.1 | 39.7 | 37.7 | 24.4 | 38.9 |
| M.P. (Thermal), ° F | 116 | 120 | 129 | 132.0 | 116 |
| $GS_3$ Fraction: |  |  |  |  |  |
| Percent Yield | 20.5 | 32.5 | 53.4 | 45.8 | 43.2 |
| I.V | 33.4 | 40.3 | 37.9 | 29.7 | 38.8 |
| Percent Trans-oleic [2] | 26.9 | 31.7 | 33.5 | 23.0 | 34.7 |
| M.P. (Thermal), ° F | 134 | 134 | 137 | 140 | 130.0 |
| $GS_2U$ Fraction: |  |  |  |  |  |
| Percent Yield | 46.7 | 40.5 | 28.4 | 31.7 | 35.0 |
| I.V | 54.3 | 63.8 | 62.6 | 52.0 | 56.8 |
| Percent Trans-oleic [3] | 35.2 | 44.3 | 44.6 | 31.2 | 45.0 |
| M.P. (Untempered) (Thermal) [4] | 100.5 | 99.5 | 97.5 | 90.5 | 102.5 |
| M.P. (Tempered) (Thermal) [5] | 100.5 | 99.5 | 98.5 | 96.5 | 102.5 |
| Residue: |  |  |  |  |  |
| Percent Yield (wt.) | 32.5 | 27.0 | 18.2 | 22.6 | 20.7 |
| M.P. (Thermal) | 40.0 | 40.0 | 55.0 | 53.0 |  |
| I.V | 73.9 | 76.2 | 80.4 | 72.2 | 70.4 |

[1] By weight on whole oil.
[2] By weight on $GS_3$ fraction.
[3] By weight on $GS_2U$ fraction.
[4] Cocoa Butter, 85.5° F.
[5] Cocoa Butter, 99.0° F.
P/N=peanut oil.
S/B=soybean oil.
C/S=cottonseed oil.

A comparison of calculated random distributions with found values, and a calculated percentage breakdown of the hard butter fraction in terms of its component glycerides is given in Table II, below.

TABLE II

| Hydro Oil | Calculated Random Distribution in Base Oils | | | | | | | | |
|---|---|---|---|---|---|---|---|---|---|
|  | $GS_3$ Type | | | $GS_2U$ Type | | | $GSU_2$ Type | | |
|  | SSS | SSE | SEE | EEE | SSO | SEO | EEO | SOO | EOO |
| P/N, 44.2 R.I. | 4.0 | 10.2 | 8.7 | 2.5 | 13.4 | 21.6 | 9.2 | 13.8 | 11.4 |
| S/B, 44.9 R.I. | 2.1 | 9.2 | 13.1 | 6.0 | 7.5 | 21.5 | 15.8 | 8.8 | 12.6 |
| Corn, 44.5 R.I. | 5.3 | 15.9 | 16.0 | 5.3 | 10.5 | 21.0 | 10.5 | 6.9 | 6.9 |
| Lard, 42.1 R.I. | 10.0 | 15.8 | 8.3 | 1.5 | 18.9 | 19.8 | 5.2 | 11.9 | 6.2 |
| C/S, 54.4 I.V. | 5.2 | 16.1 | 16.9 | 5.9 | 9.9 | 20.8 | 10.9 | 6.4 | 6.7 |

| Hydro Oil | $GU_3$ OOO | Percent $GS_3$ Calc. | Percent $GS_3$ Found | Percent $GS_2U$ Calc. | Percent $GS_2U$ Found | $GS_2U$ | | | | |
|---|---|---|---|---|---|---|---|---|---|---|
|  |  |  |  |  |  | I.V.* | | Percent by wt. on $GS_2U$ | | |
|  |  |  |  |  |  | Calc. | Found | SSO | SEO | EEE |
| P/N, 44.2 R.I. | 4.9 | 23 | 21 | 38 | 47 | 49.4 | 56.3 | 35.7 | 57.6 | 6.7 |
| S/B, 44.9 R.I. | 3.4 | 24 | 32 | 35 | 40 | 56.3 | 63.8 | 21.4 | 61.4 | 17.1 |
| Corn, 44.5 R.I. | 1.5 | 37 | 53 | 37 | 28 | 53.7 | 62.6 | 28.5 | 57.1 | 14.4 |
| Lard, 42.1 R.I. | 2.5 | 34 | 46 | 40 | 32 | 45.2 | 52.0 | 47.0 | 49.3 | 3.7 |
| C/S, 54.4 I.V. | 1.4 | 38 | 43 | 37 | 35 | 54.5 | 56.8 | 27.1 | 56.8 | 16.1 |

*Iodine value.
S=saturated acids.
E=elaidic or trans-type) oleic acid.
O=oleic or cis-type oleic acid

EXAMPLE 10

*Methyl ethyl ketone example*

One kilogram of cottonseed oil selectively hydrogenated to a Wiley Melting Point of 112.0° F. was dissolved in 4 liters of dry methyl ethyl ketone and then permitted to reach equilibrium under stirring conditions at 65.0° F. (60–75° F. can be used equally well). The crystallized stearine-like fraction was then filtered off and washed with one-half liter of solvent. The mother liquors were combined, cooled and crystallization allowed to proceed at 30–32° F. (20–35° F. can be used equally well) until equilibrium had been reached. This crystalline hard butter fraction was then filtered off and washed with an additional one-half liter of solvent. Solvent was then removed from the filtrate, and the liquid fraction was recovered. Data for this fractionation is summarized in the following table:

| Fraction | Yield (wt. percent) | Iodine Value | Thermal Melting Point | Percent Trans Acid |
|---|---|---|---|---|
| $GS_3$ Type (65° F.) | 22.7 |  | 128° F. |  |
| $GS_2U$ Type (30–32° F.) | 40.0 | 49.0 | 112° F. | [1] 41.8 |
| $GU_2S$-$GU_3$ (Filtrate) | 37.3 |  | Liquid |  |

[1] Remainder was saturated acids 43.4%; cis-oleic type acids 14.8%.

The hard butter fraction designated as $GS_2U$ was an excellent non-polymorphic product and blended well with cocoa butter or chocolate liquor in combinations up to and including 35% cocoa butter—65% hard butter (weight) to give coatings which retained their gloss well without being tempered prior to enrobing. Good gloss retention could also be secured with larger proportions of cocoa butter up to 50% of the butter where the coating was tempered prior to enrobing.

EXAMPLE 11

One kilogram of 112° W.M.P. selectively hydrogenated cottonseed oil was dissolved in 4 liters of isopropyl acetate. The temperature of the mixture was then brought down to 56.0° F. (55°–70° F. can be used equally well) and allowed to reach equilibrium under stirring conditions. The first fraction was filtered off and washed with one-half liter of isopropyl acetate. The filtrate (containing the wash solvent) was then cooled to 22.0° F. (20–35° F. can be used equally well) and allowed to reach equilibrium. When crystallization was complete, this hard butter fraction was filtered off and washed with one-half liter of isopropyl acetate. The mother liquor and wash liquor were combined and isopropyl acetate was distilled therefrom to recover the liquid oil residue. The second crop of crystals, after complete removal of solvent, was obtained in a 39.8% yield and had a thermal melting point of 112.0° F. This product was adjudged to be an excellent hard butter and displayed exceptional tolerance to blending with chocolate liquor or cocoa butter.

EXAMPLE 12

The following example displays the unusual tendency for these products to display crystalline stability in chocolate coatings. Coatings were made up in the following manner:

|  | Parts |
|---|---|
| Chocolate liquor | 15 |
| Hard butter | 25 |
| Microatomized sugar | 60 |
| Lecithin | ¼ |

Coatings were stirred for two hours in a Hobart mixer and samples enrobed untempered at 110° F. Results are given below:

| Sample Hard Butter | Initial | Storage 2 Months |
|---|---|---|
| Cocoa Butter | Soft | Bloomed Badly. |
| $GS_2U$ Hydro C/S 54.5 I.V.[1] | Firm | No Blooming or Dulling Noted. |

[1] Example 9.

The characteristics of various blends of $GS_2U$ fraction from 112° cottonseed oil of Example 1 and cocoa butter, have been evaluated using variations of the following standard coating formula to give different ratios of $GS_2U$ to cocoa butter:

|  | Percent |
|---|---|
| Sugar | 47 |
| Cocoa butter | 20 |
| Hard Fat | 33 |
| Lecithin | 0.25 |

Results obtained are as follows:

| $GS_2U$/Cocoa Butter— Ratio | Untempered | | Tempered | | Tempering— Necessary? |
|---|---|---|---|---|---|
|  | Gloss | Snap | Gloss | Snap |  |
| 10/90 | Dull | Poor | Fair+ | Good | Yes. |
| 25/75 | Dull | Poor | Fair+ | Good | Yes. |
| 50/50 | Fair— | Fair | Good | Fair | Yes. |
| 67/33 | Good+ | Good | Good+ | Good | No. |
| 100/0 | Good | Excellent | Good | Excellent | No. |

Improved soft oil

We have discovered that the soft fraction which is composed mainly of $GU_2S$ and $GU_3$ types of triglycerides and which is recovered from the final filtrate in our above-exemplified double or two-step fractionations has remarkable stability against oxidative deterioration. Whereas refined liquid oils commonly used for salad oil, for frying, etc. have A.O.M. values of 13–20 hours, the soft fraction recovered in our two-step fractionation has A.O.M. values of over 200 hours. The fraction, therefore, unexpectedly has great merit as a replacement oil for the heretofore common salad-oil-type oils. It can be used advantageously for frying, for slab dressings, for liquid shortenings, for salad oil products, and other analogous purposes where flavor stability and other forms of resistance to oxidative deterioration are sought. The following tabulation illustrates the excellent keeping qualities of the soft fractions recovered in Examples 5, 6 and 9, as compared with corresponding refined liquid oils. The fractions were bleached, cittrated, and deodorized to an edible condition before being tested for stability.

| Stock Tested | Kind | Thermal M.P., °F. | Deodorized Flavor | A.O.M. | |
|---|---|---|---|---|---|
|  |  |  |  | Hours | P.V.[1] |
| Fraction of Ex. 5 | Hydro P/N | 42 | Good | 242 | 6.0 |
| Refined Liquid Oil | P/N |  |  | 20 | >100 |
| Fraction of Ex. 6 | Hydro S/B | 38 | Good | 242 | 7.0 |
| Refined Liquid Oil | S/B |  |  | 13 | >100 |
| Fraction of Ex. 9 | Hydro C/S | 62 | Good | 288 | 8.0 |
| Refined Liquid Oil | C/S |  |  | 15 | >100 |

[1] Peroxide value.

The soft fraction recovered from solvent fractionation of domestic and equivalent non-lauric oils used in preparing the hard butters described hereinabove have an iodine value ranging from about 66.0 to 86.0. Since the iodine values in such fractions reflect mostly monoethenoic unsaturation our discovery of the remarkable stability of the fractions provides good evidence that oxidative deterioration is coupled significantly with polyethenoic unsaturation, as has long been believed but not heretofore demonstrated convincingly. It also provides some indication that our soft fractions may not be completely free of polyethenoic unsaturation.

Persons skilled in this art will recognize that the discoveries and principles set forth hereinabove can be utilized and practiced advantageously in modes which represent variations of the foregoing descriptions. To such extent as those variations are encompassed by the following claims, we contemplate them as being part of our present inventions. In those claims, the term "non-lauric" oil is intended to mean triglyceride mixtures as defined hereinabove, whether such mixtures be in liquid, plastic or solid form at ambient room temperatures.

Having thus described our invention, we claim:

1. A non-random triglyceride hard butter whose hard butter qualities are due primarily to the presence therein in major amount of at least one edible triglyceride fraction of non-lauric oil, the combined hydrocarbyl fatty acids of said fraction consisting essentially of acids of 16 and 18 carbons distributed in the following proportions:

|  | Percent |
|---|---|
| saturated fatty acids | 25–55 |
| trans monoethenoic acids | 30–50 |
| cis monoethenoic acids | 15–40 | in triglycerides of the following kinds:
    tri-(trans mono-ene) glycerides;
    mono-saturated, mono-(trans mono-ene), mono-(cis mono-ene) glycerides;
    di-saturated, mono-(cis mono-ene) glycerides; and
    di-(trans mono-ene), mono-(cis mono-ene) glycerides.

2. A non-random triglyceride hard butter in which the combined hydrocarbyl fatty acids consist essentially of acids of 16 and 18 carbons distributed in the following proportions:

|  | Percent |
|---|---|
| saturated fatty acids | 25–55 |
| trans monoethenoic acids | 30–50 |
| cis monoethenoic acids | 15–40 | in triglycerides of the following kinds:
    tri-(trans mono-ene) glycerides;
    mono-saturated, mono-(trans mono-ene), mono-(cis mono-ene) glycerides;
    di-saturated, mono-(cis mono-ene) glycerides; and
    di-(trans mono-ene), mono-(cis mono-ene) glycerides.

3. A non-random triglyceride solvent fractionated fraction of non-lauric oil in which fraction the combined hydrocarbyl fatty acids of its component triglycerides consist essentially of acids of 16 and 18 carbons distributed in the following proportions:

|  | Percent |
|---|---|
| saturated fatty acids | 25–55 |
| trans monoethenoic acids | 30–50 |
| cis monoethenoic acids | 15–40 |

4. An edible coating for food products comprising chocolate liquor and added hard butter as claimed in claim 1 in an amount of at least 10% by weight, the triglycerides of said coating consisting essentially of the triglycerides contained in the chocolate liquor plus the triglycerides contained in said added hard butter.

5. An edible coating for food products comprising chocolate liquor and added hard butter as claimed in claim 2 in an amount of at least 10% by weight, the triglycerides of said coating consisting essentially of the triglycerides contained in the chocolate liquor plus the triglycerides contained in said added hard butter.

6. An edible coating for food products comprising chocolate liquor and at least one added triglyceride fraction as claimed in claim 3 in an amount of at least 10% by weight, the triglycerides of said coating consisting essentially of the triglycerides contained in the chocolate liquor plus the triglycerides contained in said added fraction.

7. An edible coating for food products comprising hard butter as claimed in claim 1, the triglycerides of said coating consisting essentially of the triglycerides contained in said hard butter.

8. An edible coating for food products comprising hard butter as claimed in claim 2, the triglycerides of said coating consisting essentially of the triglycerides contained in said hard butter.

9. An edible coating for food products comprising at least one triglyceride fraction as claimed in claim 3, the triglycerides of said coating consisting essentially of the triglycerides contained in said fraction.

10. The method of preparing improved hard butters, which comprises the steps of: hydrogenating hydrocarbyl non-lauric glyceride oil under selective hydrogenation conditions conducive to the formation of trans monoethenoic acid; continuing the hydrogenation (a) until substantially all polyethenoic unsaturation has been eliminated, and (b) until the content of trans monoethenoic acids is sufficiently high to yield a $GS_2U$ type fraction having combined fatty acids of 16 and 18 carbons distributed therein in the following proportions:

|  | Percent |
|---|---|
| saturated fatty acids | 25–55 |
| trans monoethenoic acids | 30–50 |
| cis monoethenoic acids | 15–40 | then solvent fractionating the so-hydrogenated mass to separate said $GS_2U$ type fraction in a condition essentially free of $GS_3$ type triglycerides; and finally recovering said separated $GS_2U$ fraction in a condition essentially free of solvent.

11. The method as claimed in claim 10 wherein the solvent fractionation is a two step treatment which separates the $GS_3$ type fraction in the first step and separates the $GS_2U$ type fraction as the solid crystalline fraction of the second step.

12. The method as claimed in claim 11 wherein the solvent is dry acetone, wherein a $GS_3$ type fraction is separated at temperatures between about 68° F. and 78° F., and wherein the $GS_2U$ type fraction is separated at about 32° F.

13. The method as claimed in claim 11 wherein the solvent is methyl ethyl ketone; wherein a $GS_3$ type of fraction is separated at temperatures between about 60° F. and 75° F.; and wherein the $GS_2U$ type fraction is separated at about 20–35° F.

14. The method as claimed in claim 11 wherein the solvent is isopropyl acetate; wherein a $GS_3$ type fraction is separated at temperatures between about 55° F. and 70° F.; and wherein the $GS_2U$ type fraction is separated at temperatures between about 20° F. and 35° F.

15. The soft fraction which exhibits excellent resistance to oxidative deterioration and which is recovered as the soluble fraction in the second step of the process claimed in claim 11, said soft fraction having an iodine value between about 66 and 86.

References Cited in the file of this patent

UNITED STATES PATENTS 2,586,615    Cross    Feb. 19, 1952

FOREIGN PATENTS 590,916    Great Britain    July 31, 1947